UNITED STATES PATENT OFFICE.

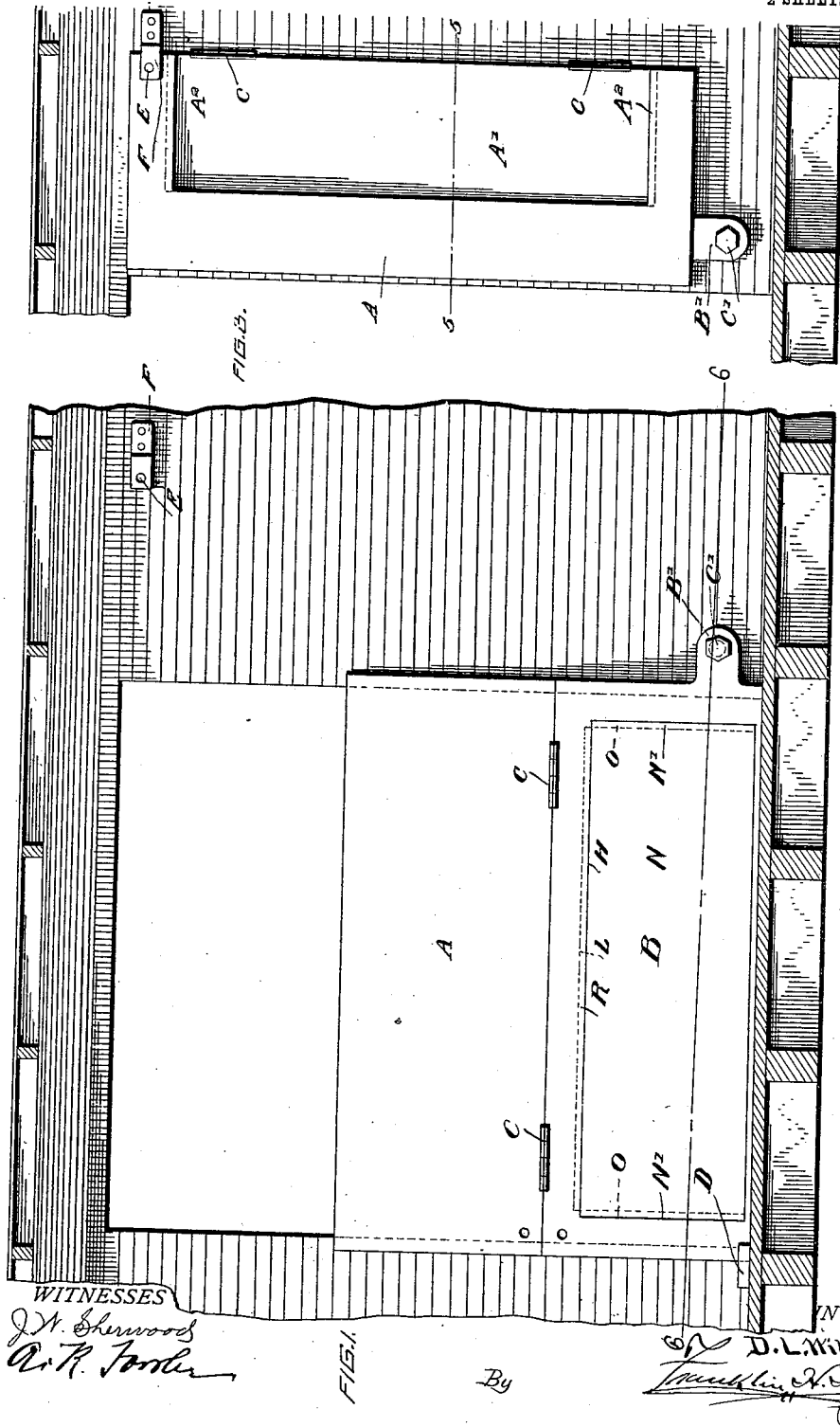

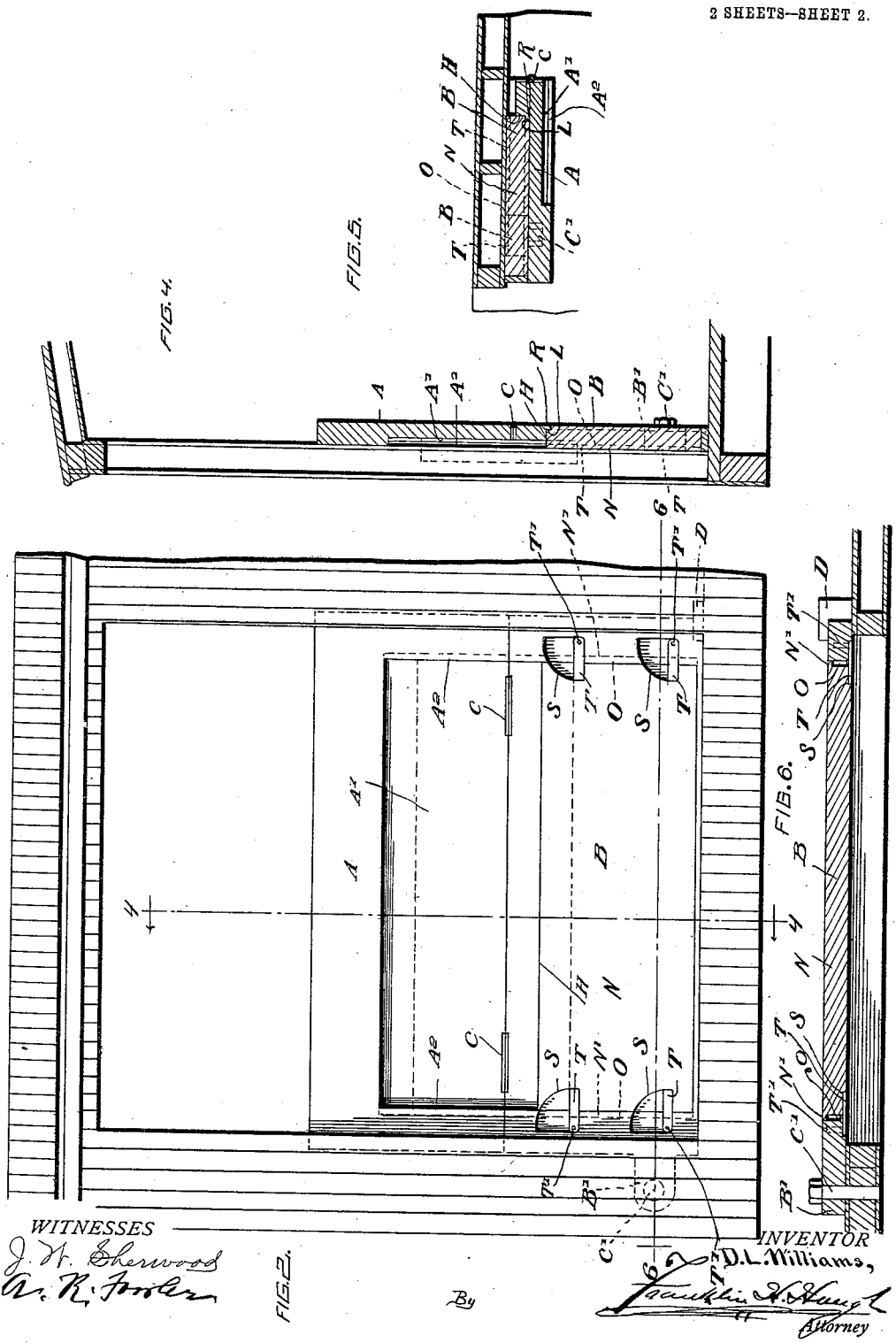

DAVID LEVI WILLIAMS, OF BLANCHARD, NORTH DAKOTA.

GRAIN-DOOR.

1,088,004. Specification of Letters Patent. Patented Feb. 24, 1914.

Application filed February 20, 1913. Serial No. 749,684.

*To all whom it may concern:*

Be it known that I, DAVID L. WILLIAMS, a citizen of the United States, residing at Blanchard, in the county of Traill and State of North Dakota, have invented certain new and useful Improvements in Grain-Doors; and I do hereby declare the following to be a full, clear, and exact description of the invention, such as will enable others skilled in the art to which it appertains to make and use the same, reference being had to the accompanying drawings, and to the letters and figures of reference marks thereon, which form a part of this specification.

This invention relates to new and useful improvements in grain doors for cars and consists of a simple and efficient device of this nature having various details of construction and combinations and arrangements of parts which will be hereinafter fully described, shown in the accompanying drawings and then specifically defined in the appended claims.

My invention is illustrated in the accompanying drawings, in which:—

Figure 1 is a side elevation showing my improved car door as applied across the door opening, the view being taken from the inside of the car. Fig. 2 is a side elevation of the door looking from the outside of the car. Fig. 3 is an elevation showing the door folded when not in use and viewed from the inside of the car. Fig. 4 is a sectional view on line 4—4 of Fig. 2. Fig. 5 is a sectional view on line 5—5 of Fig. 3, and Fig. 6 is a sectional view on line 6—6 of Fig. 2.

Reference now being had to the details of the drawings by letter, A and B designate two sections of the grain door, connected together by hinges C, and section B is provided with a laterally extending lug B' which is apertured for the reception of a bolt C', fastened to the side wall of the car and forming a pivotal means whereby the two sections of the door, when not in use, may be folded back to the position shown in Fig. 2 of the drawings. Cleats D are fastened to the floor of the car a slight distance from the wall and near the door opening and serve to hold the door securely when adjusted in place, as shown in Fig. 1 of the drawings. When the sections are folded to the position shown in Fig. 3, they are held in place by means of a bolt E passing through registering apertures in the two sections and through an angled bracket member F which is secured to the wall of the car.

Upon reference to the drawings, it will be noted that the section B is provided with an opening H and a sliding panel N, having flanges N' at the ends thereof, is adapted to be positioned in said opening to form a closure therefor. The ends of the opening are flanged as at O and which are engaged by the flanges of the panel to limit the outer throw thereof in order to allow the panel to be raised into the recess A' of the door A and held therein by means of the flanges $A^2$ formed at the ends of said recess A'.

It will be noted upon reference to the cross sectional view of the drawings that the rear surface of the panel is provided with a shoulder L which extends the length of the panel and which allows the panel to move back beyond the flange R at the upper marginal edge of said opening. It will be noted that, when the panel is at its farthest inner limit, its outer face will be flush with the outer face of the section B in which position it may be held by means of the buttons T pivoted at T' and adapted to engage the recesses S formed in the face of the panel as shown.

In adjusting the door for use, the sections are positioned as shown in Fig. 1. When it is desired to adjust the panel to allow the grain or other material to run out through the opening, the buttons T are thrown out of the recesses S, the panel allowed to move forward by pressure of the grain behind it, the limit of movement being determined by the flanges at the ends of the panel coming in contact with the flanges at the ends of the opening, after which the panel may be raised into the recess formed in the face of the section A and held in raised positions by means of the buttons which may be swung down with their free ends projecting beyond the ends of the opening and held in such positions by the walls of the recesses in which the buttons are mounted. When it is desired to fold the doors, the panel may be returned to its normal position and held by the buttons, after which the top section may be folded down against the rear of the lower section and the two swung to the position shown in Fig. 2 and held in the manner shown.

By the provision of a door embodying the features of my invention, it will be noted that a simple and efficient device is afforded which may be conveniently attached to any ordinary car and form a means to allow the grain to be discharged without waste by simply allowing the panel to be raised to the desired height, regulating the exit opening.

What I claim to be new is:—

1. A grain door made up of sections hinged together, means for fastening the same to the wall of a car, one of said sections having an opening therein, a panel movable within said section, the adjacent door section being recessed, forming means to receive the panel as it is raised out of said opening, as set forth.

2. A grain door made up of sections hinged together, means for fastening the same to the wall of a car, one of said sections having an opening therein and the other section recessed upon one face thereof, flanges at the ends of said opening and recess, a flanged panel mounted in said opening, the flange of the panel adapted to engage and be guided by the flanges at the ends of the opening and recess as the panel is raised and lowered, as set forth.

3. A grain door made up of sections hinged together, means for fastening the same to the wall of a car, one of said sections having an opening therein and the other section recessed upon one face thereof, flanges at the ends of said opening and recess, a flanged panel mounted in said opening, the flange of the panel adapted to engage and be guided by the flanges at the ends of the opening and recess as the panel is raised and lowered, the rear of said panel having a shoulder adapted to engage a flange at the upper end of said opening, and means for holding the panel in said opening, as set forth.

4. A grain door made up of sections hinged together, means for fastening the same to the wall of a car, one of said sections having an opening therein and the other section recessed upon one face thereof, flanges at the ends of said opening and recess, a flanged panel mounted in said opening, the flange of the panel adapted to engage and be guided by the flanges at the ends of the opening and recess as the panel is raised and lowered, the rear of said panel having a shoulder adapted to engage a flange at the upper end of said opening, and buttons pivoted to the face of the lower section and adapted to engage said panel, as set forth.

5. A door for grain cars comprising two sections hinged together, a pivot connecting one section to the wall of the car, one of said sections provided with an opening and the other section recessed with flanges along the ends of the opening and recess, a panel mounted in said opening and having flanges at its ends adapted to engage the flanges at the ends of the opening and recess, said panel movable within the recess, as set forth.

6. A door for grain cars comprising two sections hinged together, a pivot connecting one section to the wall of the car, one of said sections provided with an opening and the other section recessed with flanges along the ends of the opening and recess, a panel mounted in said opening and having flanges at its ends adapted to engage the flanges at the ends of the opening and recess, said panel movable within the recess, and means for holding the sections folded, as set forth.

7. A door for grain cars comprising two sections hinged together, a pivot connecting one section to the wall of the car, one of said sections provided with an opening and the other section recessed with flanges along the ends of the opening and recess, a panel mounted in said opening and having flanges at its ends adapted to engage the flanges at the ends of the opening and recess, said panel movable within the recess, the sections having registering apertures when folded, a bolt passing through said apertures, and a bracket member fixed to the wall of the car and adapted to engage said bolt, as set forth.

In testimony whereof I hereunto affix my signature in the presence of two witnesses.

DAVID LEVI WILLIAMS.

Witnesses:
  JOE MCNEILLY,
  J. E. WILLIAMS.

---

Copies of this patent may be obtained for five cents each, by addressing the "Commissioner of Patents, Washington, D. C."